(12) United States Patent
Moore, Jr.

(10) Patent No.: US 7,438,815 B1
(45) Date of Patent: Oct. 21, 2008

(54) INHIBITING AMMONIA EMISSIONS AND ODORS FROM ANIMAL WASTES WITH OIL

(75) Inventor: Philip A. Moore, Jr., Fayetteville, AR (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 11/640,090

(22) Filed: Dec. 15, 2006

Related U.S. Application Data

(60) Provisional application No. 60/754,410, filed on Dec. 28, 2005.

(51) Int. Cl.
*C02F 3/00* (2006.01)

(52) U.S. Cl. .................. 210/610; 210/916; 210/753; 210/754

(58) Field of Classification Search .................. 210/610, 210/916, 753–754
See application file for complete search history.

(56) References Cited

U.S. PATENT DOCUMENTS

| | | |
|---|---|---|
| 5,622,697 A | 4/1997 | Moore, Jr. |
| 5,865,143 A | 2/1999 | Moore, Jr. |
| 5,890,454 A | 4/1999 | Moore, Jr. |
| 5,914,104 A | 6/1999 | Moore, Jr. |
| 5,928,403 A | 7/1999 | Moore, Jr. |
| 5,961,968 A | 10/1999 | Moore, Jr. |
| 6,346,240 B1 | 2/2002 | Moore, Jr. |
| 6,602,464 B1 * | 8/2003 | Rapp et al. ............... 422/5 |
| 2001/0011646 A1 | 8/2001 | Moore, Jr. |
| 2003/0198569 A1 * | 10/2003 | Rapp et al. ............... 422/5 |

* cited by examiner

*Primary Examiner*—Chester T Barry
(74) *Attorney, Agent, or Firm*—John Fado; Randall E. Deck; Lesley Shaw

(57) ABSTRACT

Lipids, such as plant oils and animal fats, are effective for treatment of animal wastes to inhibit both the emission of ammonia and other odors, and the discharge of particulate matter, microorganisms, and endotoxins, therefrom. Inhibition of ammonia volatilization and particulate or microbial discharge is effected by application of an effective amount of a lipid containing composition onto the animal wastes. Moreover, when used in combination with solutions of salts of acidic proton donors such as aluminum chloride, aluminum nitrate, and alum, these lipids significantly improve the effectiveness of the proton donors to inhibit the release of ammonia and reduce phosphorous solubility.

28 Claims, No Drawings

INHIBITING AMMONIA EMISSIONS AND ODORS FROM ANIMAL WASTES WITH OIL

CROSS-REFERENCE TO RELATED APPLICATION

This application claims the benefit under 35 U.S.C. 1.19(e) of U.S. provisional No. 60/754,410, filed Dec. 28, 2005, the contents of which are incorporated by reference herein.

BACKGROUND OF THE INVENTION

1. Field of the Invention

The invention is drawn to a method for controlling the emissions of ammonia and other odors and reducing phosphorous runoff from animal wastes.

2. Description of the Prior Art

Swine and other livestock are commonly reared in facilities that are specially designed to manage manure and liquid waste generated by such livestock. For example, in some swine rearing facilities, swine are raised in enclosed facilities that have slatted floors. Beneath the floors are pits for receiving swine manure and urine that pass through the slatted floor. These pits contain water that is occasionally drained to remove the livestock waste. Other facilities raise swine on a hard slanted floor, and periodically wash accumulated manure and urine from the slanted floor. Still other facilities use a combined approach, and have slatted floors on which the swine are raised, and a slanted floor underneath that is periodically washed to remove accumulated manure and urine. Water that is used to flush manure in these facilities is often pumped into large tanks that can be quickly discharged to rapidly flush manure from the facility.

Dairy cows are also often raised in facilities that must periodically be washed of animal manure and urine. The dairy cows are often fed in a sheltered pen that has a hard concrete floor that is periodically washed.

Farmers manage the waste water from livestock rearing facilities in several manners. Almost all farmers attempt to apply the waste water onto agricultural fields. Some farmers spread the waste water from the facilities directly onto their fields. Other farmers first send the waste water to a holding pond or lagoon before spreading the waste water onto their fields. Because solids tend to separate from the water in the center of the holding pond or lagoon, some farmers withdraw water from the center of the pond or lagoon and reuse it in their facilities.

Manure excreted by the livestock generate ammonia that contributes to the offensive odor in many livestock rearing facilities. Ammonia volatilization is especially acute in facilities that are flushed with recycled water from an anaerobic lagoon or holding pond. Nitrogen in swine lagoon effluent is mostly in the form of $NH_4$, with little $NO_3$ present. Indeed, ammonia concentrations of 350 mg/l and greater are common in lagoon effluent. In addition, because swine lagoon effluent is typically alkaline (pH>7.0), ammonia is favored over ammonium, resulting in conditions favorable for ammonia volatilization. When high pH water from swine lagoons is used for flush water, large quantities of ammonia are volatilized, causing even further elevated levels of ammonia gas inside and outside the rearing facility.

High atmospheric ammonia levels in swine rearing facilities have been shown to have a significant negative effect on feed consumption, feed conversion and daily weight gain in pigs. High levels of atmospheric ammonia in swine rearing facilities also increase the susceptibility of swine to microorganisms responsible for respiratory problems, such as *P. multocida*. Ammonia also increases the susceptibility of four week old pigs to conchal atrophy. Likewise, high ammonia levels in swine facilities may play a significant role in the development of atrophic rhinitis.

Another detrimental aspect of $NH_3$ volatilization from hog manure is the effect on acid rain. The reportedly dominant source of atmospheric $NH_3$ in Europe is livestock waste, with long term trends showing a 50% increase in $NH_3$ emissions in Europe from 1950 to 1980. Ammonia raises the pH of rainwater, which allows more $SO_2$ to dissolve in it. Ammonium sulfate then forms, which oxidizes in the soil, releasing nitric and sulfuric acid. This produces two to five times the acid input to soils previously described for acid atmospheric deposition, resulting in extremely low pH values (2.8-3.5) and high levels of dissolved aluminum in non-calcareous soils. Ammonia volatilization can also contribute to eutrophication. Reports show that nitrogen deposited via wet fallout tripled in Denmark from 1955 to 1980, corresponding to increases in nitrogen losses from agricultural operations during this period. The rising levels of nitrogen in the fallout have also been linked to the $NH_3$ content in Danish streams.

Atmospheric ammonia can also result in the formation of ammonium nitrate particles in the air. These particles, which are usually less than 2 microns in size, contribute greatly to small airborne particles referred to as PM-10's (particulate matter less than 10 microns).

Swine (*Sus scrofa domesticus*) production is currently on the rise in the United States. As the swine industry moves into watersheds susceptible to eutrophication, various groups have voiced concern over water pollution. Modern swine rearing facilities often have large numbers of animals and a relatively limited land base to apply the manure. This leads to excessive application of nutrients, especially phosphorus, to the land. Phosphorus is considered to be the primary cause of eutrophication of freshwater systems. The threat of eutrophication due to phosphorus runoff has already resulted in limits being placed on the amount of animal units produced per area of land in The Netherlands.

Recently, Moore has described the use of aluminum sulfate (alum), aluminum chloride, aluminum nitrate, and various iron or calcium amendments to reduce phosphorous solubility and/or inhibit ammonia volatility on a animal waste products such as poultry litter and liquid or solid animal manures (U.S. Pat. Nos. 5,622,697; 5,865,143; 5,890,454; 5,914,104; 5,928,403; 5,961,968; and 6,346,240; and published patent application no. US 2001/0011646, the contents of each of which are incorporated by reference herein). However, although these processes have been highly successful, the need remains for improved processes for treating animal manures to reduce phosphorous solubility and inhibit ammonia volatilization.

SUMMARY OF THE INVENTION

I have now discovered that lipids such as plant oils and animal fats are effective for treatment of animal wastes to inhibit both the emission of ammonia and other odors, and the discharge of particulate matter, microorganisms, and endotoxins, therefrom. In the process of the invention, inhibition of ammonia volatilization and particulate or microbial discharge is effected by application of an effective amount of a lipid containing composition onto the animal wastes. Moreover, when used in combination with solutions of salts of acidic proton donors such as aluminum chloride, aluminum nitrate, and alum, these lipids significantly improve the effectiveness of the proton donors to inhibit the release of ammonia and reduce phosphorous solubility.

In accordance with this discovery it is an object of this invention to provide an improved method for inhibiting the emission of ammonia and other odors from animal manures using lipids.

A further object of this invention is to provide an improved method for inhibiting the discharge of particulate matter, microorganisms, and/or endotoxins from animal manures.

It is another object of this invention to provide an improved method for inhibiting the emission of ammonia and other odors from animal manures using common plant oils and animal fats, including used cooking oils and fats.

Yet another object of this invention to provide an improved method utilizing a waste product such as used cooking oils and fats, for inhibiting the emission of ammonia and other odors from animal manures.

Still another object of this invention is to provide an improved process for inhibiting ammonia volatilization and/or reducing phosphorous solubility using a combination of a lipid with aluminum chloride, aluminum nitrate, alum and other proton donors.

Other objects and advantages of the invention will become apparent from the ensuing description.

DETAILED DESCRIPTION OF THE INVENTION

The process of this invention may be used for the treatment of biological waste materials which include animal waste such as manure and/or urine, and poultry litter (which is typically a mixture of poultry manure, bedding material such as recycled paper, straw, wood shavings, saw dust, rice hulls, or peanut hulls, spilled feed, and feathers). While the treated waste material may be solid manure or liquid urine per se, the process is particularly suited to the treatment of waste materials present as liquid slurries of manure in urine, or manure and/or urine mixed with water or aqueous treatment solutions, such as that used for flushing manure and urine from controlled animal rearing facilities or other facilities for permanently or temporarily holding animals. The process may be used for the treatment of animal wastes generated by a variety of livestock, and domestic or wild animals, including but not limited to zoo animals, sheep, swine, poultry, goats, cattle, dairy cows, horses, ducks, or geese. However, the process is particularly suited to the treatment of animal wastes from animal containment facilities used for the large-scale rearing of dairy cattle and the production of swine and cattle.

In accordance with this invention, biological waste material comprising the animal waste is contacted with a treatment composition of a lipid. In a preferred embodiment, a liquid composition of lipid is applied directly onto the surface of the waste material. Moreover, as it is common practice in the art to collect, flush, or otherwise store animal wastes within tanks, pits, lagoons, holding ponds or settling ponds, it is understood that the lipid may be applied onto the surface of the biological waste material contained in any of these sites. In an alternative embodiment, the lipid may be provided in combination with liquid or aqueous compositions used to rinse or wash manure and/or urine from the floors, walls or other surfaces of the animal rearing facilities. In yet another embodiment, the lipid may be dispersed in the liquid or slurries contained within the above-mentioned tanks, pits, lagoons, holding ponds or settling ponds, whereupon the lipid will typically rise to the surface thereof. In any of these embodiments, the lipid functions by floating on or coating the surface of the waste material, creating a physical barrier to inhibit the passage of ammonia and other volatiles and odors from the waste material into the surrounding atmosphere. Moreover, the application of the lipid may also provide the further benefit of reducing the discharge or release of particulate matter, microorganisms, and/or endotoxins from the waste material into the atmosphere. Another health hazard that may be encountered in animal rearing facilities is the discharge of particulate matter (i.e., dust) and opportunistic or pathogenic microorganisms or their endotoxins, from the waste material into the surrounding atmosphere. This problem is particularly acute in enclosed facilities wherein air is constantly circulated over the waste by fans. Thus, the lipid coating resulting from the application of the lipid also acts as a physical barrier to inhibit the passage of these components as well.

A variety of lipids are suitable for use herein, including those of animal or plant origin, and particularly fixed oils from either source. The lipids may be in pure or impure form or in mixtures. Although triglycerides or fatty acids may be used, as a practical matter plant oils or animal fats are preferred, with used or waste cooking oils and fats such as from restaurants or commercial food production facilities being particularly preferred. Without being limited thereto, for ease of application, particularly by spraying, lipids such as plant oils which are liquids at the temperatures prevailing at the time and site of application (indoors or outdoors) are preferred. However, it is also understood that fats or oils which are solids may also be used. For example, solid phase lipids may be converted to a liquid form for application such as by heating, and may also be applied by spraying. In another alternative embodiment, it is envisioned that solid phase lipids may also be applied onto the waste, which lipids are subsequently converted to a flowable liquid covering the waste by heat emanating from the animal waste itself. Without being limited thereto, preferred lipids for use herein include processed or unprocessed (crude) plant oils, such as corn oil, soybean oil, peanut oil, canola oil, cottonseed oil, rice oil, olive oil, sesame oil, sunflower oil, palm oil, safflower oil, linseed oil, crambe oil, rapeseed oil, and combinations of two or more of the above.

In an optional, yet particularly preferred embodiment, the biological waste material is further treated with a salt of an acidic proton donor to enhance the inhibition of ammonia volatilization and/or to reduce phosphorous solubility. Suitable salts of acidic proton donors for use in the invention are those which are effective to inhibit ammonia volatilization, such as by lowering the pH of the waste material and thereby shifting the ammonia/ammonium equilibria towards ammonium, or reduce phosphorous solubility. Preferred salts of acidic proton donors include but are not limited to aluminum chloride, aluminum nitrate, aluminum sulfate, alum, ferrous chloride, ferrous sulfate, ferric nitrate, ferric chloride, ferric sulfate, ferric nitrate, calcium chloride, calcium sulfate, calcium nitrate, magnesium chloride, magnesium sulfate, magnesium nitrate, potassium aluminum sulfate, sodium sulfate, sodium aluminum sulfate, sodium bisulfate, hydrochloric acid, sulfuric acid, phosphoric acid, nitric acid, and combinations thereof, with aluminum chloride, aluminum nitrate, aluminum sulfate, alum, ferrous chloride, ferric chloride, calcium chloride being particularly preferred. The above-mentioned salts may be used in any of their anhydrous or various, known hydrated forms. The acidic proton donor is added to the biological waste material in an amount effective to elicit an effect selected from the group consisting of inhibiting ammonia volatilization, reduce phosphorous solubility, or both.

Methods for the treatment of biological waste materials with these salts of acidic proton donors which are suitable for use herein including suitable amounts, formulations, and their application, are described in detail in Moore (U.S. Pat.

Nos. 5,622,697; 5,865,143; 5,890,454; 5,914,104; 5,928,403; 5,961,968; and 6,346,240; and published patent application no. US 2001/0011646, the contents of each of which are incorporated by reference herein). Treatment of the biological waste material with the salt of an acidic proton donor may be before or after the lipid treatment, but in the preferred embodiment, the treatments are concurrent, and most preferably the agents are mixed.

Surprisingly, I have found that the treatment of the biological waste material with lipids unexpectedly alleviates the problem of excessive foam generation on the surface of the waste material which may occur during the treatment with some salts of acidic proton donors alone, such as aluminum chloride or aluminum sulfate. When applied to the biological waste material in the presence of lipids, these acidic proton donors generate a significantly reduced volume of foam relative to that generated in the absence of lipid. Moreover, the foam that is produced is relatively thick and condensed, having a gel-like consistency, and itself also functions as a physical barrier on the surface of the waste material to inhibit both the volatilization of ammonia and other odors, and the discharge of particulate matter, microorganisms, and endotoxins, into the atmosphere. Thus, the addition of the lipids not only aids in prevention of ammonia volatilization, but it also eliminates the need for the addition of defoaming agents such as described in the earlier Moore patents.

Depending upon the absence or presence of the above-mentioned salt of an acidic proton donor, the lipids of this invention function to inhibit the volatilization of ammonia and other odors, such as mercaptans, dimethyl sulfide, hydrogen sulfide, and/or volatile organic compounds, and also inhibit the discharge of particulate matter, microorganisms, and/or endotoxins, by acting as a thin lipid layer or film coating the surface of the biological waste material, or by forming a foam layer over the surface of the waste material, respectively. In either embodiment, the lipid film or foam both act to inhibit the volatilization of ammonia and the other odors, and the discharge of particulate matter, microorganisms, and endotoxins, by functioning as a physical barrier to their passage from the waste material into the atmosphere. Optimum inhibition of ammonia and odor volatilization, and discharge of particulate matter, microorganisms, and endotoxins, is therefore achieved when the amount of the lipid is sufficient to form a substantially continuous layer over the surface of the biological waste material with relatively few regions without coverage. Although lesser amounts may be used, the skilled practitioner will recognize that an increase in the number or size of exposed surface areas of the waste material which are not covered with lipid may result and will decrease efficiency. Accordingly, the lipid is applied in an amount effective to inhibit either or both of the volatilization of ammonia and/or other odors, or the discharge of particulate matter, microorganisms and/or microbial endotoxins, from the biological waste material into the atmosphere as determined by routine testing. An "effective amount" is defined herein as that amount which will result in either or both of (1) a significant reduction in the volatilization of ammonia or other odors, or (2) a significant reduction in the discharge of any or all of particulate matter, microorganisms or endotoxins, from a treated biological waste material into the atmosphere, as compared to an untreated control (measured at a confidence level of at least 80%, preferably measured at a confidence level of 90%). Measurements may be conducted using air sampling techniques known in the art. For example, without being limited thereto, particulate levels may be determined by measurement of PM-10s or PM-2.5s (i.e., particles less than 10 or 2.5 microns, respectively). Suitable amounts of the lipid may be readily determined by a practitioner skilled in the art, and will vary with the particular lipid selected, the environmental conditions, and if facility rinse or wash solutions containing lipid are recycled. By way of example and without being limited thereto, in a preferred embodiment the ratio, by weight, of lipid to biological waste material to be treated is between about 0.00001:99.99999 and about 50:50, most preferably between about 0.1:99.9 and about 20:80. Higher amounts of lipid within this range are generally preferred for treatment of relatively concentrated, low volume sites such as are typically found in pits below the floors of animal containment facilities, while lower amounts of lipid are generally preferred for treatment of relatively dilute, large volume sites such as lagoons and ponds. For liquid biological waste materials (including slurries), preferred amounts of lipid include but are not limited to between about 0.001 to about 200 grams of lipid per liter of biological waste material, particularly between about 0.01 to about 20 grams of lipid per liter of biological waste material.

Besides the lipid and the salt of the acidic proton donor, other additives and adjuncts may be formulated into the composition. Suitable additives may include, but are not limited to, oxidizing agents such as hydrogen peroxide or potassium permanganate, polymers, fungicides, fungistats, bactericides, bacteriostats, or combinations thereof, with addition of polymers to flocculate solids being preferred. A variety of polymers are suitable for flocculating particulates, and include naturally occurring polymers, synthetic polymers such as polyacrylamide, and it is envisioned that cationic polyelectrolytes (such as proteins or gum arabic, polyethyleneimine, or polyacrylic acid salts) would also be suitable.

It is understood that the foregoing detailed description is given merely by way of illustration and that modifications and deviations may be made therein without departing from the spirit and scope of the invention.

I claim:

1. A method for treating animal waste comprising applying a composition comprising a lipid onto a biological waste material comprising animal waste, said lipid being applied in an amount effective to elicit at least one effect selected from the group consisting of inhibiting the volatilization of ammonia or other odors or both from said waste material, and inhibiting the discharge of one or more of particulate matter, microorganisms or microbial endotoxins from said waste material into the atmosphere, and applying a composition comprising an acidic proton donor to said biological waste material in an amount effective to elicit an effect selected from the group consisting of inhibiting ammonia volatilization, reducing phosphorous solubility, and combinations thereof, wherein said animal waste comprises manure, urine, or mixtures thereof.

2. The method of claim 1 wherein said lipid is selected from the group consisting of plant oil, animal fat, and combinations thereof.

3. The method of claim 1 wherein said lipid comprises a plant oil.

4. The method of claim 3 wherein said plant oil is selected from the group consisting of corn oil, soybean oil, peanut oil, canola oil, cottonseed oil, rice oil, olive oil, sesame oil, sunflower oil, palm oil, safflower oil, linseed oil, crambe oil, rapeseed oil, and combinations thereof.

5. The method of claim 1 wherein said biological waste material comprises an aqueous slurry of said animal waste.

6. The method of claim 1 wherein said biological waste material is substantially solid.

7. The method of claim 1 wherein said biological waste material is on a solid surface, and said lipid is applied to said biological waste material by flushing said surface with said composition comprising said lipid.

8. The method of claim 1 wherein said amount of said lipid is sufficient amount to form a continuous layer over the surface of said biological waste material.

9. The method of claim 1 wherein said animal waste is from sheep, swine, poultry, goats, cattle, dairy cows, horses, ducks, or geese.

10. The method of claim 1 wherein said proton donor is selected from the group consisting of aluminum chloride, aluminum nitrate, aluminum sulfate, alum, ferrous chloride, ferrous sulfate, ferric nitrate, ferric chloride, ferric sulfate, ferric nitrate, calcium chloride, calcium sulfate, calcium nitrate, magnesium chloride, magnesium sulfate, magnesium nitrate, potassium aluminum sulfate, sodium sulfate, sodium aluminum sulfate, sodium bisulfate, hydrochloric acid, sulfuric acid, phosphoric acid, nitric acid, and combinations thereof.

11. The method of claim 10 wherein said proton donor is selected from the group consisting of aluminum chloride, aluminum nitrate, aluminum sulfate, alum, ferrous chloride, ferric chloride, calcium chloride, and combinations thereof.

12. The method of claim 1 wherein said lipid and said proton donor are mixed.

13. The method of claim 1 wherein the ratio, by weight, of said lipid to said biological waste material is between about 0.00001:99.99999 and about 50:50.

14. The method of claim 13 wherein the ratio, by weight, of said lipid to said biological waste material is between about 0.1:99.9 and about 20:80.

15. The method of claim 1 wherein said biological waste material comprises a liquid and said amount of said lipid is between about 0.001 to about 200 gram of lipid per liter of said biological waste material.

16. The method of claim 15 wherein said amount of said lipid is between about 0.01 to about 20 grams of lipid per liter of said biological waste material.

17. The method of claim 1 wherein said biological waste material is contained within a pit, lagoon, holding pond or settling pond.

18. The method of claim 1 wherein said lipid is applied in an amount effective to inhibit the volatilization of ammonia or other odors or both from said waste material.

19. A method of treating animal waste generated by livestock reared in a controlled rearing facility, wherein said animal waste comprises manure, urine, or mixtures thereof, and said facility comprises a surface to receive said animal waste from said livestock, comprising contacting the animal waste with a treatment composition comprising a lipid and an acidic proton donor.

20. The method of claim 19 wherein said lipid is provided in an amount effective to inhibit foaming resulting from said contacting of said animal waste with said proton donor.

21. The method of claim 19 wherein the surface is a pit, and said treatment composition is provided in said pit.

22. The method of claim 19 wherein the livestock comprises sheep, swine, poultry, goats, cattle, dairy cows, horses, ducks or geese.

23. The method of claim 19 wherein said lipid and said proton donor are added in sufficient quantities to form or cause the formation of one or more physical layers on top of said animal waste which are effective as barriers inhibiting the passage of one or more of gases, particulates, microorganisms or endotoxins, therethrough, said physical layers comprising a layer of foam, a layer of oil, or both.

24. The method of claim 19 wherein said lipid is selected from the group consisting of plant oil, animal fat, and combinations thereof.

25. The method of claim 19 wherein said lipid comprises a said plant oil.

26. The method of claim 25 wherein said plant oil is selected from the group consisting of corn oil, soybean oil, peanut oil, canola oil, cottonseed oil, rice oil, olive oil, sesame oil, sunflower oil, palm oil, safflower oil, linseed oil, crambe oil, rapeseed oil, and combinations thereof.

27. The method of claim 19 wherein said proton donor is selected from the group consisting of aluminum chloride, aluminum nitrate, aluminum sulfate, alum, ferrous chloride, ferrous sulfate, ferric nitrate, ferric chloride, ferric sulfate, ferric nitrate, calcium chloride, calcium sulfate, calcium nitrate, magnesium chloride, magnesium sulfate, magnesium nitrate, potassium aluminum sulfate, sodium sulfate, sodium aluminum sulfate, sodium bisulfate, hydrochloric acid, sulfuric acid, phosphoric acid, nitric acid, and combinations thereof.

28. The method of claim 27 wherein said proton donor is selected from the group consisting of aluminum chloride, aluminum nitrate, aluminum sulfate, alum, ferrous chloride, ferric chloride, calcium chloride, and combinations thereof.

* * * * *